A. A. OILAR.
LOCK NUT.
APPLICATION FILED MAY 20, 1910.

985,443.

Patented Feb. 28, 1911.

Witnesses

Inventor
Arthur A. Oilar.
By C. A. Snow & Co.
Attorneys

UNITED STATES PATENT OFFICE.

ARTHUR A. OILAR, OF PITTVILLE, CALIFORNIA.

LOCK-NUT.

985,443.  Specification of Letters Patent.  Patented Feb. 28, 1911.

Application filed May 20, 1910. Serial No. 562,480.

*To all whom it may concern:*

Be it known that I, ARTHUR A. OILAR, a citizen of the United States, residing at Pittville, in the county of Lassen and State of California, have invented a new and useful Lock-Nut, of which the following is a specification.

It is the object of the present invention to provide an improved form of lock nut, and the invention aims primarily to provide a nut which may be contracted about a bolt for the purpose of being locked against rotation thereon, and while it has been proposed to provide a nut consisting of two members having interfitting conical portions so that the tightening of one of the members will result in a contraction of the other to frictionally bind about the bolt, the present invention contemplates the provision of a contractible nut embodied in an integral or unitary structure. Furthermore, such proposed constructions do not positively lock on the bolt, but merely frictionally, whereas the present invention contemplates a mutilation of the threads of the bolt by certain toothed ribs provided upon the wall of the bore of the nut, which ribs bite into the threads of the bolt and serve as a positive lock.

Figure 1:
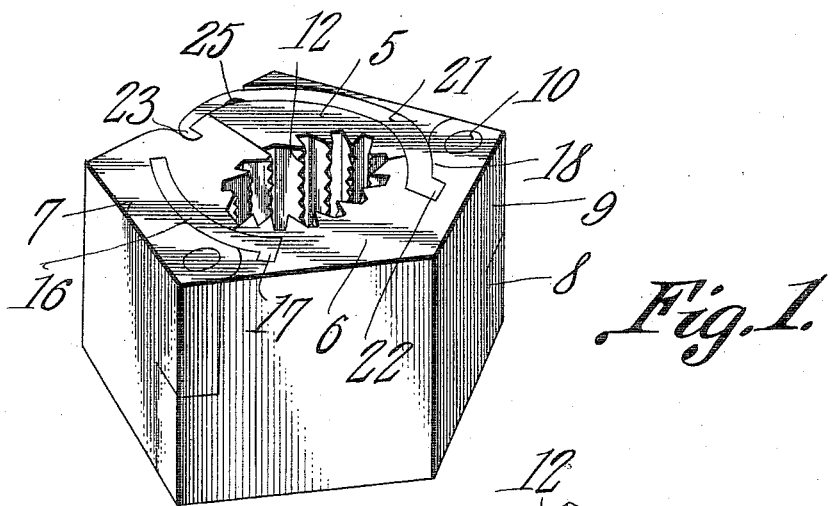
Figure 2:
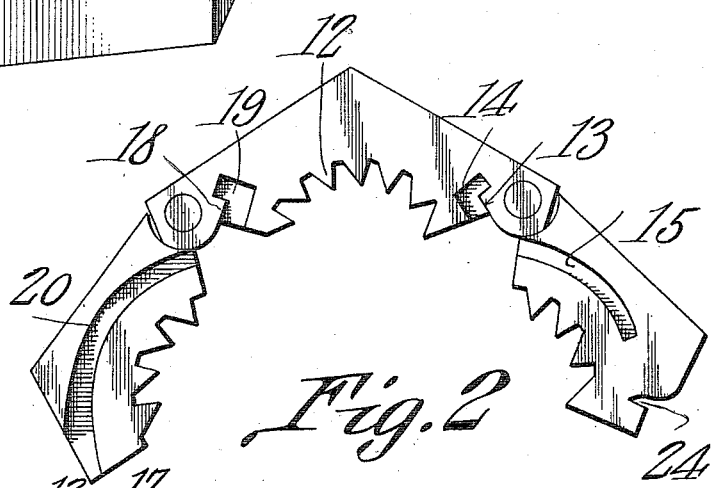
Figure 3:
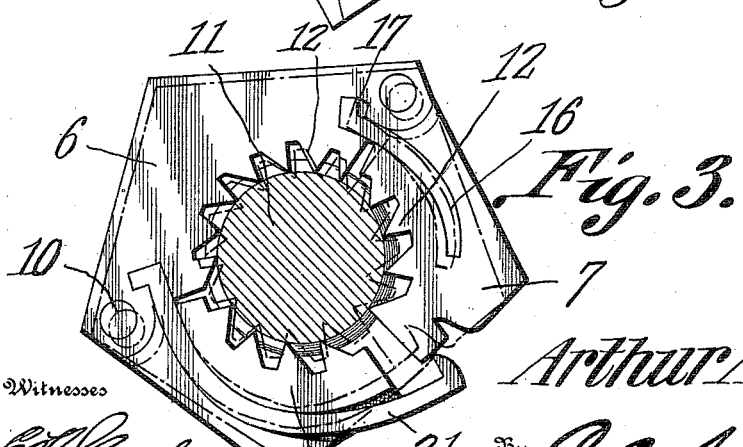

In the accompanying drawings,—Figure 1 is a perspective view of a lock nut constructed in accordance with the present invention, the same being shown with its sections in locked condition. Fig. 2 is a plan view of the nut, the means for holding the sections thereof yieldably together being removed, and the said sections being swung away from each other. Fig. 3 is a front elevation of the nut applied to a bolt, the sections of the nut being shown in full lines in the position they assume while being threaded upon the bolt and being shown in dotted lines in locked relation.

In the drawings, the nut embodying the present invention is illustrated as embodying a plurality of sections, here shown as three in number, one of these sections being indicated by the numeral 5, another by the numeral 6, and the third by the numeral 7. Each end of the section 6 and one end of each of the sections 5 and 7 is formed with a recess 8 resulting in a pintle lug 9, these lugs of the said sections being fitted together and pivot pins 10 being engaged therethrough whereby to pivotally connect the said sections 5 and 7 to the section 6.

It will be observed that the free ends of the sections 5 and 7 may be brought together in the position shown in Fig. 1 of the drawings so as to afford a complete nut having substantially the same appearance as the ordinary nut now in use, and each of these sections is formed in its inner face with a recess of such contour that when the sections are in the relative position shown in Fig. 1 of the drawings, a substantially cylindrical bore will be afforded to receive the threaded shank of the bolt illustrated in Fig. 3 of the drawings and indicated by the numeral 11. The wall of the recess of each section is formed with a plurality of ribs 12 extending lengthwise thereof and substantially triangular in cross section, the sharp edges of these ribs being toothed, as at 12, for a purpose to be presently explained. The toothing of the ribs is preferably accomplished by a machine, such as ordinarily employed in threading nuts so that the teeth will extend in spiral series and will therefore properly engage with the threads of the bolt 11 when the nut is threaded thereon. It will be observed that these teeth or rather the notches between the teeth are of a depth less than the height of the ribs 12 and the purpose of this relative proportioning of the parts will be presently explained.

The sections of the nut are normally held in closed relation through the medium of flat springs which are seated in recesses or grooves in the said sections and in the nut. To accommodate these springs, the section 6 of the nut is formed with a short groove 13 near one end, and with a branch 14 preferably extending toward the outer side of the said section. An arcuate groove 15 is formed in the corresponding face of the section 7 and at one end registers with the groove 13 when the sections 6 and 7 are in closed relation, as shown in Fig. 1. A flat spring 16 is seated in the groove 15 and its continuation 13, and has a lateral extension 17 seating in the branch 14. It will be understood that any stress placed upon the two sections 6 and 7 tending to swing them open upon their pivot 10 will result in a flexing of the spring 16 and its partial withdrawal from the groove 15. This is due to the fact that the offset 17 prevents the withdrawal of this end of the spring from that portion of the groove in which it is seated. In a like manner, the section 6 is formed in its same face and adjacent its opposite end with an arcuate groove 18 and with a branch 19 and the corresponding face of the section 5 is formed with an arcuate groove 20 which registers with the groove 18 when the sections are in closed relation. A flat spring 21 is seated in the grooves 18 and 20 and has a lateral extension or projection 22 seating in the branch 19. This spring 21 performs the same function as does the spring 16 and also serves as a means for locking the sections in closed relation in a manner which will now be described.

The groove 20 is slightly widened at its end opposite the end at which it registers with the groove 18, as will be observed from an inspection of Fig. 2 of the drawings, and the spring 21 is of such length as to project beyond this end of the groove and has its extremity bent at an angle so as to afford a hook 23 which springs into engagement with a shoulder 24, when the sections are closed whereby to hold them in such relation. In order that the bent end 23 of the spring 21 may be moved out of engagement with the shoulder 24, the said spring is formed in its concaved edge with a notch 25 in which may be engaged the point of a nail or any similar implement.

In applying the nut of the present invention to an ordinary bolt, it is threaded upon the bolt in the usual manner with its sections in the position illustrated in Fig. 3 of the drawings, that is with the sections partly separated, as they would be prior to engagement of the bent end 23 of the spring 21 with the shoulder 24. After the nut has been properly threaded upon the bolt, the sections are closed in any suitable manner, as for example, by striking a blow with a hammer upon that face of the section 5 which the convex side of the spring 21 opposes. This will serve not only to close the sections, but in so doing, the toothed edges of the ribs 12 will be caused to bite into and mutilate the threads of the bolt 11. Therefore, in effect, the nut is contracted about the bolt to such degree as to cause a mutilation of the threads of the bolt and a positive gripping of the bolt by the nut.

It is obvious that the nut may be made up of more or less than three sections and that the sections may be held in partly closed position by other means than the springs 16 and 21 or that these springs may be differently arranged from the manner illustrated in the present drawings.

What is claimed is:

1. A nut comprising a plurality of pivoted sections, adjacent ones of the sections being formed with communicating grooves, springs seated in the grooves and tending to close the sections, means for holding the sections when fully closed, the sections being recessed to provide between them a bolt opening the bore of which is arranged to coöperate with the threads of a bolt and to mutilate said threads when the sections are fully closed.

2. A nut comprising a plurality of pivoted sections, adjacent ones of the sections being formed with communicating grooves, springs seated in the grooves and tending to close the sections, the spring in one groove being extended and formed with a hooked end, a shoulder upon one of the sections and engageable by the hooked end of the spring when the sections are fully closed, the sections being recessed to provide between them a bolt opening the bore of which is arranged to coöperate with the threads of a bolt to mutilate said threads when the sections are fully closed.

3. A nut comprising a plurality of pivoted sections, adjacent ones of the sections being formed with communicating grooves, springs seated in the grooves and tending to close the sections, means for holding the sections when fully closed, the sections being recessed to provide between them a bolt opening, the bore of the bolt opening being formed with ribs extending lengthwise of the opening, the said ribs being formed to coöperate with the threads of a bolt, the said ribs being arranged to mutilate the said threads when the sections are fully closed about the bolt.

In testimony that I claim the foregoing as my own, I have hereto affixed my signature in the presence of two witnesses.

ARTHUR A. OILAR.

Witnesses:
PERRIN SHORT,
MARY A. ROSE.